(12) United States Patent
Huang et al.

(10) Patent No.: US 7,241,386 B2
(45) Date of Patent: Jul. 10, 2007

(54) WATER CLEANER AS IMMERSED IN WATER TANK

(76) Inventors: Chuan-Chi Huang, 2F-1, No. 111, Hoping East Road, Sec. 3, Taipei (TW); Kuo-Yuan Chan, No. 209, Yen-Lu Road, Sec. 2, Pu-Hsin Hsiang, Chang-Hua Hsien (TW)

( * ) Notice: Subject to any disclaimer, the term of this patent is extended or adjusted under 35 U.S.C. 154(b) by 0 days.

(21) Appl. No.: 11/223,601

(22) Filed: Sep. 9, 2005

(65) Prior Publication Data
US 2007/0056892 A1 Mar. 15, 2007

(51) Int. Cl.
*C02F 9/00* (2006.01)
(52) U.S. Cl. .................... 210/242.1; 210/282
(58) Field of Classification Search ........... 210/282, 210/242.1
See application file for complete search history.

(56) References Cited

U.S. PATENT DOCUMENTS

| | | | | |
|---|---|---|---|---|
| 264,463 A | * | 9/1882 | Koeppel | 210/282 |
| 4,416,854 A | * | 11/1983 | Nielsen | 210/748 |
| 4,836,932 A | * | 6/1989 | Walsh | 210/695 |
| 5,980,752 A | * | 11/1999 | Bowers | 210/282 |
| 6,245,230 B1 | * | 6/2001 | Ricci | 210/282 |
| 6,641,787 B1 | * | 11/2003 | Siggins et al. | 210/242.1 |

* cited by examiner

*Primary Examiner*—Ivars C. Cintins

(57) ABSTRACT

A water cleaner comprises: a filtering canister having a plurality of filtering holes formed through the canister and made of oxidation-reduction alloy for filtering off chlorine and other hazardous materials contained in the water when passing through the filtering holes formed through the canister; and a functional water-treatment material filled in the canister for killing bacteria or fungi, for removing pollutants, and for removing odor in the water for cleaning water in a water tank or reservoir.

2 Claims, 2 Drawing Sheets

WATER CLEANER AS IMMERSED IN WATER TANK

BACKGROUND OF THE INVENTION

For cleaning water in a water tank or reservoir especially for providing clean drinking water, a sterilizing material may be added into the tank for killing bacteria or fungi and a deodorant may also be provided for deodorization. However, it generally requires a complex water treatment or filtration apparatus or system for cleaning the water, thereby being uneconomic for a family use or for use in a small building or apartment.

The present inventor has found the drawbacks of the prior arts and invented the present water cleaner as immersed in a water tank.

SUMMARY OF THE INVENTION

The object of the present invention is to provide a water cleaner comprising: a filtering canister having a plurality of filtering holes formed through the canister and made of oxidation-reduction alloy for filtering off chlorine and other hazardous materials contained in the water when passing through the filtering holes formed through the canister; and a functional water-treatment material filled in the canister for killing bacteria or fungi, for removing pollutants, and for removing odor in the water for cleaning water in a water tank or reservoir.

DETAILED DESCRIPTION

Figure 1:
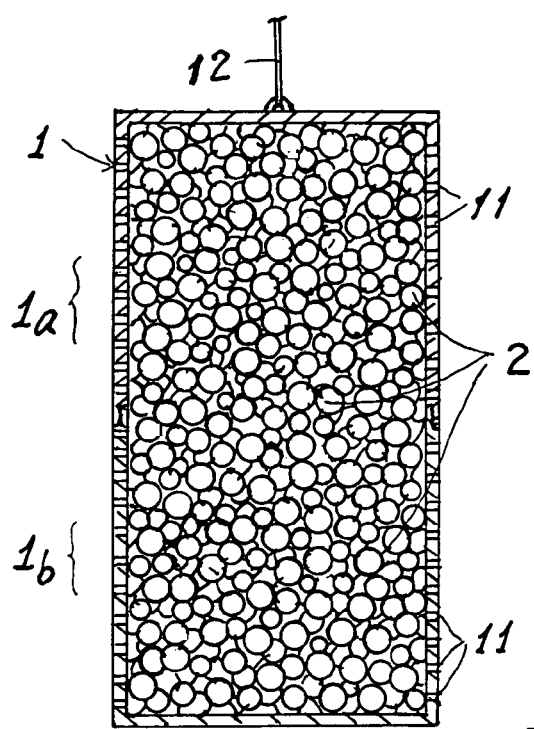
FIG. 1 is a sectional drawing of the present invention.
Figure 2:
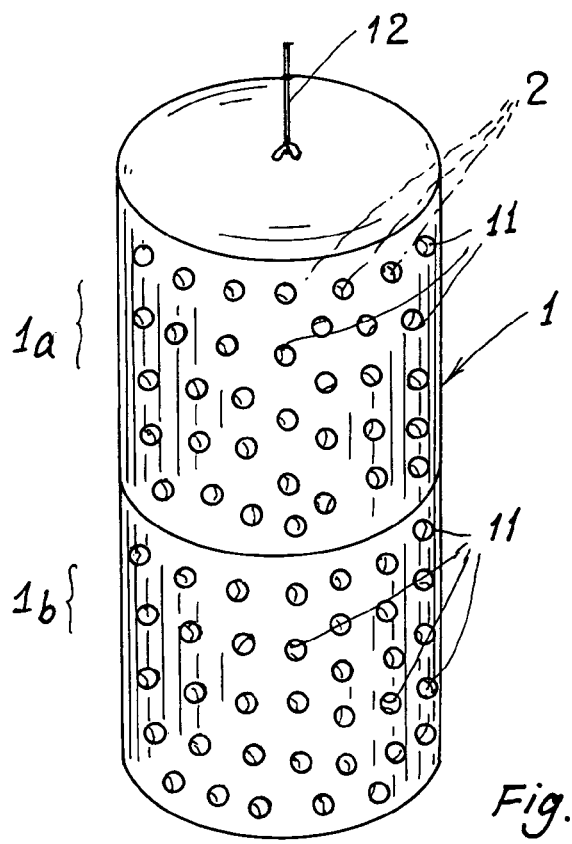
FIG. 2 is a perspective view of the present invention.

As shown in FIGS. 1~4, the present invention comprises: a filtering canister 1 formed with a plurality of filtering holes 11 therethrough and immersed in water in a water tank (or reservoir) T and pendently hung from a float 13 as floating on a water level W in the water tank 1 (FIG. 3); and a functional water-treatment material 2 filled in the canister 1 for anti-bacterial, anti-fungal, pollution-preventive and deodorizing purposes.

Figure 3:
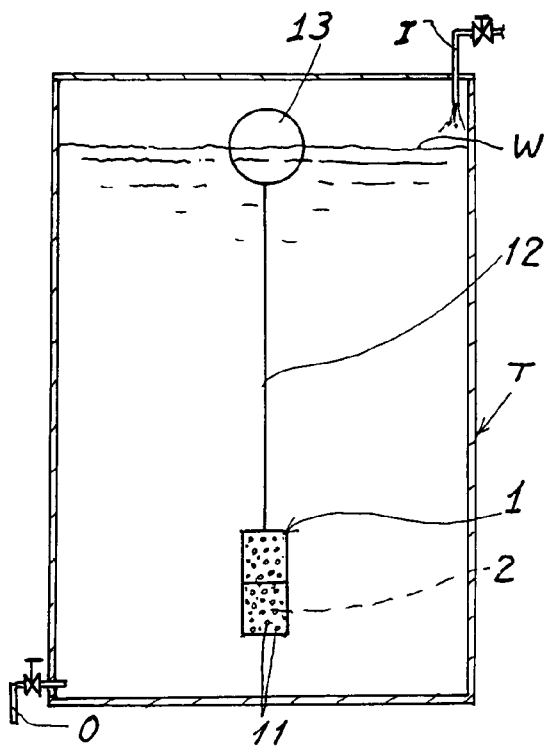
FIG. 3 is an illustration showing the canister of the present invention hung under a float as floating in a water tank.

The filtering canister 1 is pendantly secured to or hung from the float 13 as floating on the water level W as shown in FIG. 3 through a wire or rope 12 connected between the canister 1 and the float 12.

Figure 5:
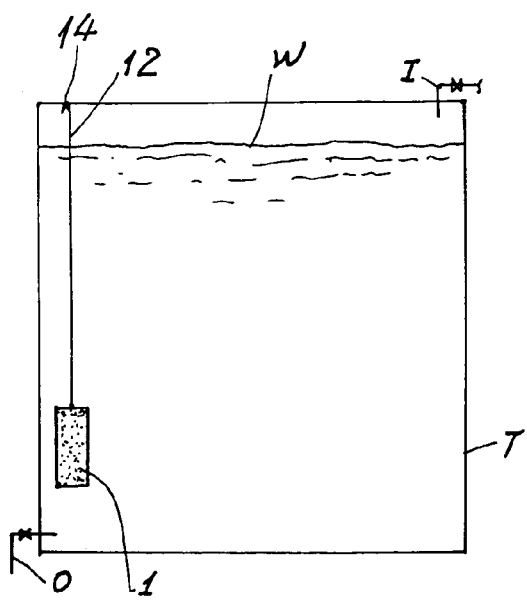
FIG. 5 shows another preferred embodiment of the present invention.

The filtering canister 1 may also be directly secured to or hung from a hook member or fixing element 14 fixed or formed in the water tank T as shown in FIG. 5 by a wire or rope 12, not limited in this invention.

Naturally, the canister 1 may also be directly connected to a water inlet I or water outlet O of a water supply system of the tank T, also not limited in this invention.

The functional water-treatment material 2 as filled in the canister 1 may comprise: tourmaline, photocatalyst, effective microorganisms, nano silver (or silver of nano size), and other deodorant, cleaning agent, sterilizing agent, filtering material or any other water-treatment materials. The functional material 2 may be obtained by fully or partially mixing the materials as above-mentioned.

The functions of the major ingredients of the functional water-treatment material 2 and canister 1 are summarized as follows:
1. Tourmaline provided for deodorizing, anti-bacterial, anti-fungal and for activating a drinking water;
2. Photocatalyst provided for killing bacteria, virus and fungi for cleaning water;
3. Effective microorganisms rendering microorganisms helpful for human health;
4. Nano silver (under allowable concentration) provided for removing poisonous materials or elements in the water; and
5. The oxidation-reduction alloy (e.g., zinc-copper alloy) provided for filtering chlorine and other poisonous elements.

The functional material 2 may be formed as granules, pelletes, or any other shapes, not limited in this invention.

The canister 1 may be formed by combining or assembling a pair of half cylinders 1a, 1b as shown in the drawing figures for filling, re-filling of the functional material 2 into the canister.

Or, the canister 1 may include a cover detachably openable for filling the functional material 2 in the canister 1.

The canister 1 may be formed as cylindrical, spherical or any other shapes, not limited in this invention.

As shown in FIG. 3, the canister 1 is hung under the float 13 to be immersed in the water tank T, whereby upon a downward streamflow of the feed (or incoming) water from the water inlet I, the float 13 will be moved and agitated by the eddy flow or turbulent flow caused by the incoming water from the inlet I to simultaneously move the canister 1 as carried under the float 13, thereby increasing the contacting opportunities between the water and the canister and the functional material 2 in the canister 1 for efficiently cleaning the water.

Figure 4:
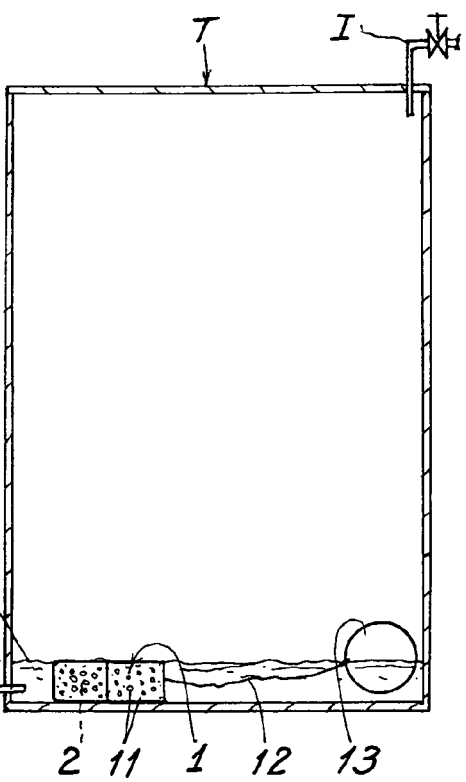
FIG. 4 shows the condition when water level drops in the water tank.

Once the water level W is dropped as shown in FIG. 4, the canister 1 may be gravitationally lowered to be laid on the bottom of the tank T, still performing its water-treatment "duty" even at such a low level as shown in FIG. 4. A sensor (not shown) will be actuated to re-start a water pump for pumping water into the tank. The float 13 will be raised by water buoyancy to hang the canister 1 in the water as shown in FIG. 4.

The canister 1 is moved in the water tank T by the agitation of the water as fed into the tank or discharged from the tank to increase the mass transfer among the relevant elements or materials to enhance the water treatment efficiency of this invention.

The present invention is superior to the prior arts with the following advantages:
1. The canister 1 carrying the functional water-treatment material 2 therein may be moved in a water tank as agitated by incoming feed-water steamflow to increase the ion-exchange opportunities and contacting area between the water-treatment material and the water for better cleaning the water.
2. The implementation of the canister 1 including functional material 2 in a water tank is easy, economic, simple for maintenance or free of maintenance.
3. The canister 1 is made of oxidation-reduction alloy for effectively filtering or removing chlorine in situ when immersed in water.

The present invention may be modified without departing from the spirit and scope of this invention.

We claim:

1. A water cleaner comprising:

a filtering canister hung under a float to be immersed in water in a water tank and having a plurality of filtering holes formed through the canister and made of oxidation-reduction alloy for filtering off chlorine and hazardous materials contained in the water when passing through the filtering holes in the canister; and a functional water-treatment material comprising: tourmaline, photocatalyst, effective microorganisms, nano silver and oxidation-reduction alloy; and filled in the canister for killing bacteria or fungi, for removing pollutants, and for removing odor in the water for cleaning water in the water tank; whereby upon a downward streamflow of incoming water from a water inlet, the float will be moved and agitated by eddy flow or turbulent flow caused by the incoming water from the inlet to simultaneously move the canister as hung under the float for increasing contacting opportunities among the water, the canister and the functional material in the canister for efficiently cleaning the water.

2. A water cleaner according to claim 1, wherein said canister is formed by combining a pair of half cylinders.

* * * * *